Figure 7:
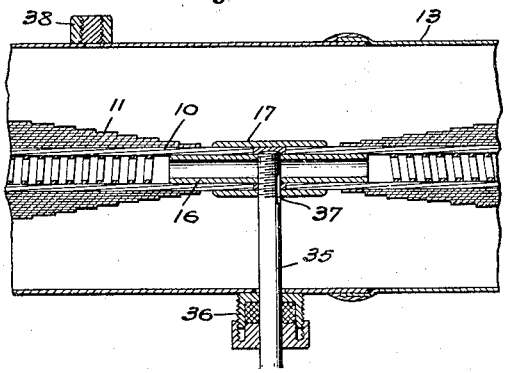

Aug. 3, 1937.                    F. V. CALVERT                    2,089,052
                              HIGH TENSION CABLE SYSTEM
                              Filed Jan. 16, 1929            2 Sheets-Sheet 1
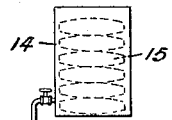
Fig.1.
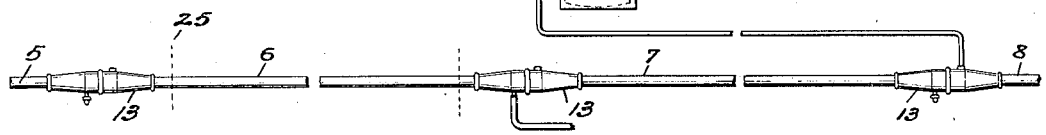
Fig.2.
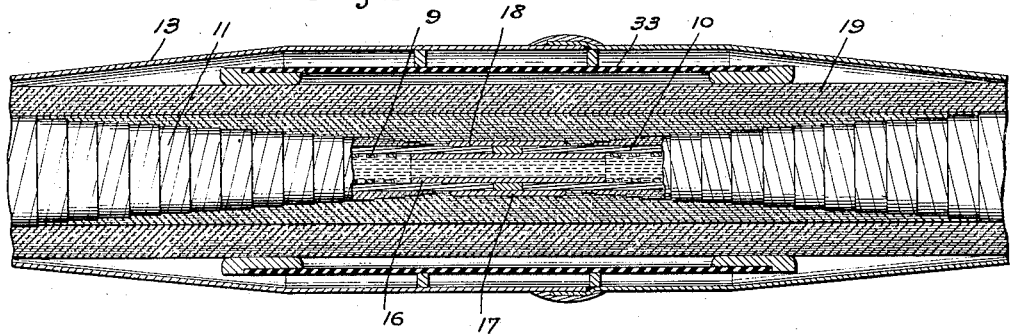
Fig.3.
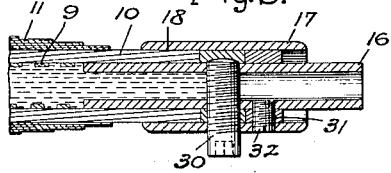
Fig.4.
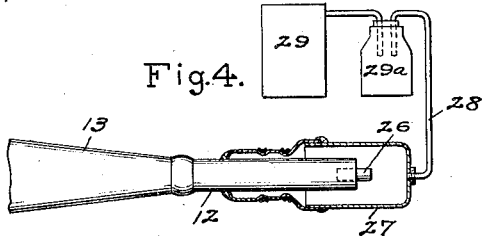
Fig.5.
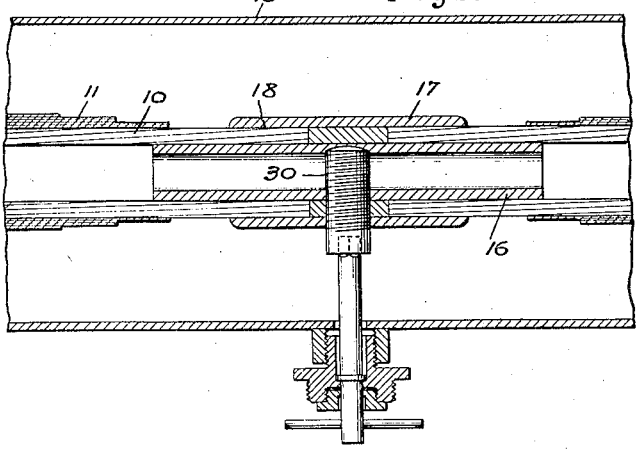
Fig.6.
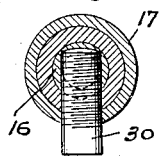
Inventor:
Francis V. Calvert
by Charles E. Tullar
His Attorney Aug. 3, 1937.    F. V. CALVERT    2,089,052
HIGH TENSION CABLE SYSTEM
Filed Jan. 16, 1929    2 Sheets-Sheet 2

Inventor:
Francis V. Calvert,
by Charles E. Tullar
His Attorney.

Patented Aug. 3, 1937

2,089,052

UNITED STATES PATENT OFFICE 2,089,052

HIGH TENSION CABLE SYSTEM

Francis V. Calvert, Madison, Maine, assignor to General Electric Company, a corporation of New York Application January 16, 1929, Serial No. 332,892

7 Claims. (Cl. 173—268)

The present invention is directed to high tension cable systems or installations of the type having a conductor which is covered by fluid-impregnated insulation, such as paper, a well defined channel for the fluid insulation such as oil and an impervious sheath, as of lead for example. Cables of this character are made in sections and are usually placed in underground conduits with suitable spaced manholes in which the sections are joined to make a continuous cable both electrically and mechanically. The lengths of the sections vary with different conditions existing at the place of installation. Associated with the cable are fluid containing reservoirs which receive fluid from the heated cable and feed it back as the cable cools. The preferred practice is to divide the cable into sections as regards the fluid supply, particularly where the ground is hilly, by means of fluid stop joints, in order to prevent too great hydrostatic pressure on any one section.

Should a burn-out or other injury occur in any given section it is of course necessary to remove that section and to substitute a new one. Such a procedure involves certain difficulties in that if the cable is cut to remove a section it will, unless special arrangements are provided to prevent it, result in draining fluid not only from the section which is to be removed, which is unimportant, but also from one or more other sections, which is a serious matter. Draining fluid from a cable permits air or water or both to enter it in greater or lesser amounts, depending upon how completely the cable or its sections are drained. The loss of insulating fluid involves or may involve re-treating the cable in whole or in large part in the field, a proceeding which is expensive and requires a considerable period of time during which the cable is out of service.

My invention has for its object to provide means and a method of procedure whereby a section of an oil or other fluid filled cable in a cable system may be disconnected from the other sections and removed and a new section substituted without involving a substantial loss of fluid insulation on the one hand or the admission of an appreciable amount of air or moisture to the interior of the cable sheaths of the other sections on the other hand.

For a consideration of what I believe to be novel and my invention, attention is directed to the accompanying description and the claims appended thereto.

Figure 8:
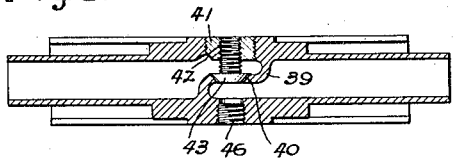
Figure 10:
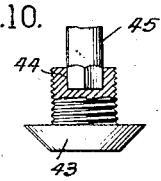
Figure 9:
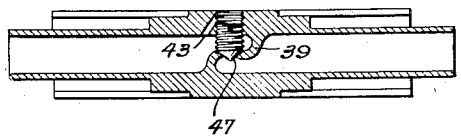

In the drawings which are illustrative of my invention Fig. 1 is a diagrammatic view of a cable installation showing several sections of a high tension oil filled cable system; Fig. 2 is a sectional view of a connector and some of the other parts of a joint; Fig. 3 is a slight modification of the connector; Fig. 4 shows a cap for enclosing the cut end of a cable together with means whereby the trapped air within the cable end and cap may be removed; Fig. 5 shows a screw plug or valve means for interrupting the flow of fluid through the cable; Fig. 6 is a cross-section through the cable showing the plug in its seated position; Fig. 7 shows a modified form of valve or plug; Figs. 8 and 9 show further modifications of the valve means, and Fig. 10 shows a means for moving the screw plug or valve.

In Fig. 1 are indicated four sections of a high tension underground oil filled cable and may be taken as representative of a system containing a great many such sections. The sections 5, 6, 7 and 8 are similar in construction, each comprising a hollow core 9 which forms a channel, is filled with oil and over which the conductors 10 forming the cable are stranded in the ordinary manner. Surrounding the stranded conductor is a wrapping of many turns of oil impregnated paper 11 and surrounding the paper is a sheath 12, Fig. 4, made of lead or equivalent material. The sheaths of the several sections are united one with the other by means of casings 13 which are hermetically sealed to the sheaths as by wiped joints for example, said sheaths and casings retaining the fluid insulation within the cable and also preventing the admission of air and moisture. Located within the casings are joints which electrically and mechanically unite the sections into a continuous cable. The core is filled with oil, usually rather thin, which impregnates the paper from the inside outwardly. Some of the sections are provided with reservoirs 14 to receive oil from the cable as it expands due to increase of temperature of the conductors as the current flowing therein increases and which feed oil back to the cable as the oil cools with decrease of load on the cable. Each reservoir is hermetically sealed to prevent the admission of air and contains yielding means, such as cellular elements 15 the walls of which move to assist in compensating for changes in volume of the oil.

By way of example each connector for uniting adjacent sections of the cable comprises an inner hollow member having tubular extensions 16 on each side of the center with which the conductors engage, and an outer and usually shorter tubular member 17 which surrounds the conductors. In other words, the connector has two sockets 18 which receive the ends of the conductors and in which they are secured by solder by the ordinary sweating method. As thus shown oil is free to flow from one section to the other or others, and its flow is facilitated by the reservoirs 14 of which as many may be provided as are necessary. The adjacent end portions of the insulations are cut away by steps to form a long taper as shown in Fig. 2, and surrounding the ends and also the metal connector is a wrapping of tape 19, of suitable character, only a portion of which is shown for simplicity of illustration.

Consider now that one of the cable sections, say 6 for example, has a burn-out, i. e., the insulation is destroyed at some point. The first step is to cut the burned out section in a suitably located manhole as indicated by the dotted line 25 at some point and preferably in close proximity to a joint casing. If there is a feeding reservoir connected to the injured section it should be shut off from said section to reduce the flow of fluid. As soon as the cable is severed, the ends are bent away from each other, preferably by bending the end of the good section upwardly to form a trap to prevent the admission of air as fully as possible. A plug 26, Fig. 4 is driven into the hollow core of the cable to stop further flow of oil from the uninjured section. There will be some oil escape from both cable ends during this operation, the amount depending upon the pressure exerted on the oil either by the reservoir supplying the section or to the hydrostatic head due to one end of the cable being more elevated than the other, or to both. Such oil as escapes can be caught in a suitable vessel placed under the exposed ends. The next step is to sweat on to the short severed ends of the cable an end covering or test cap 27, Fig. 4, which may be made of lead or harder metal. To this cap is attached a short pipe 28 by means of which the air that is trapped in the cap and cable end may be removed. This may be done by means of a vacuum pump 29 having a glass bottle 29a in series therewith to form an indicating device, or by pouring in oil to flush out the air, after which the pipe or its receiving opening is closed. Although the plug 26 closes the core and stops the flow of oil at this point there will be some seepage of oil through the exposed edges of the paper insulation and between the strands of the conductor. This is advantageous because it prevents the entrance of air. Any air which remains in the cap will naturally rise to the highest point and when the cap is removed will be contained therein.

The opposite end of the cable section which is to be removed is cut in the same manner and the adjacent end of the good cable section is plugged and capped in the manner described. The oil contained in the damaged section may be permitted to drain into any suitable vessel situated at the lower end. If the cable is so nearly level as not to drain freely, gas under pressure delivered at one end may be employed to assist in forcing it out. After the injured section is drained it may be pulled out by the usual means and another section drawn into the conduit.

The next step is to unsolder the casing 13 of one of the joints and move the parts thereof backward to expose the joint. Enough of the tape 19 is then removed to expose the connector. A suitable connector has previously been described but it may be of any suitable or well known type. Whatever form is employed the next step is to drill a hole in the center of the connector, using a suitable jig for the purpose, which hole is of a diameter slightly greater than the diameter of its bore, said hole being subsequently tapped and a valve in the form of a screw plug 30 inserted in place which completely shuts off the flow of oil from the connected cable section. During this drilling and tapping operation a limited amount of oil will escape. This is advantageous because it prevents the entrance of air. After this is done the plugged end of the short piece of injured section is removed by melting the solder which secures it to the connector. The adjacent end of the new section is then properly prepared and soldered into the socket in the connector. A casing is temporarily soldered in place about the joint to permit treatment of the cable, i. e., to remove any entrapped air and to introduce oil. The opposite end of the new cable section and that of the old or uninjured section are similarly treated and united, after which the new section is evacuated and oil admitted, all through the casing. The screw plugs then are backed out sufficiently to establish a through passage for the oil from both of the originally installed sections into the new section.

In order to remove the air from within the newly installed section and prior to partly backing out the screw plugs which function as valves, a second and smaller hole 31 may be drilled and tapped in the connector, as shown in Fig. 3. To the casing may be threaded a pipe, the outer end of which is connected to a vacuum pump to withdraw the air. Oil may then be introduced into the new section through a hole or opening at the other end while the vacuum pump is still working, or while the vacuum is still on the new section, the plug valve 30 in the joint opposite from the one where the vacuum is established may be opened and oil from the connected section permitted to enter the newly installed section, after which the outer casing is removed and the small opening 31 is filled with a plug 32. Having properly filled the cable with oil from the reservoirs or from an additional source of supply or both, the plug valves 30 at the ends of the new section are removed and short screw threaded plugs substituted which leave the center channel or core free and which at their outer ends are finished flush with the peripheral surface of the connector.

After the through passage for the oil is established, the jointer cuts the paper insulations on the new section to the proper shape as indicated in Fig. 2 and then winds on a suitable tape to complete the joint. A barrier 33 may also be provided when desired. The parts of the permanent casing are then moved into position and soldered together and to the cable sheaths. The air contained in the casing is then removed either by a vacuum pump or by being flushed out by filling the same with oil through a suitable opening which is subsequently plugged.

Referring to Fig. 7, the connector is constructed as previously described, but the screw threaded plug or valve means is different. In this case the rod 35 is screw threaded on its inner end and is of such a diameter as to completely fill the central opening in the connector and shut off the flow of oil from one side to the other. The rod extends through the casing and is provided with a suitable head at its outer end to receive a wrench for turning it. Where the rod extends through the casing it is provided with a suitable packing gland 36 to prevent the escape of oil or the admission of air, it being understood of course that the ends of the casing are hermetically sealed to the lead sheaths of the cable sections. In one side of the rod is formed a longitudinal slot 37 which is long enough to establish communication between the inside of the connector on one side of the valve and the region within the casing, that portion of the cable and connector on the opposite side of the valve being sealed fluid tight. The casing has a screw threaded opening 38 to which a vacuum pump may be attached for evacuating the cable section connected to the right hand side of the valve, or oil may be admitted through said opening. Normally it will be closed by a screw plug. If desired two such openings may be provided, one for the vacuum pump and the other for oil. When the right hand section has been properly evacuated and filled with oil, the rod is turned through 180° and the cable section on the left hand side treated in the manner described. The screw threaded portion of the valve or rod should be long enough so that the turning above mentioned will not open the passage from one side to the other of the connector. After the cable has been properly treated and filled with oil the casing is removed, the screw threaded valve removed and a short screw plug inserted which fills the opening but does not extend through the center of the connector. While this exchange is taking place the pressure in the oil due to the reservoir or reservoirs or hydrostatic head or both will cause a small amount of oil to escape, which is desirable because it prevents the admission of air. The next step is to properly insulate the joint and replace the casing. When this is done the casing is flushed with oil to remove the air, using for this purpose the opening 38 which is subsequently plugged. The opening for the rod is also suitably sealed. Both openings may of course be used in flushing the joint.

In Fig. 8 is shown a modified form of connector and valve which is primarily intended for new installations. The connector has a central partition 39 in which is formed a valve seat 40 of suitable shape. Above the seat is a screw threaded bushing 41 which has a small diagonal port or opening 42. The valve 43 has a screw threaded stem which enters the bushing, and the upper end has a socket 44 to receive a suitable wrench 45 for turning it. Below the valve is a screw threaded opening containing a threaded plug 46 for controlling it. This plug is also provided with a wrench receiving socket. When the valve is seated the cable section on the left hand side can be evacuated and filled with oil in the manner previously described. By removing the plug 46 and seating the valve the cable on right hand side of the connector can be treated. When the valve 43 is open a through passage for the oil is established, and the opening of the valve also closes the port 42 to prevent the escape of oil or the admission of air. The valve 43 and plug 46 are adjusted by wrenches 45 which extend inwardly through the wall of the casing and packing gland, said casing and gland being omitted from the figures for simplicity of illustration.

In Fig. 9 the connector has a partition as before and a screw threaded plug 47 is provided which, when open, also closes the diagonal port 42. Assuming that the new section has been inserted and properly connected as shown in Fig. 1, the casings are temporarily replaced, the valves in the two outer connectors being closed, a vacuum is established in the central casing which action removes trapped air and gas from the two adjacent sections. The valves in the connectors at the outer ends are then backed out sufficiently to establish through passages and fluid flows from section to section. It is also desirable in many cases to supply an additional amount of oil rather than to depend for the supply upon the sections which are connected to the new section. After the sections are filled with oil the casings are again removed, the proper and permanent adjustments of the valves made either by sawing off the excess metal or inserting short plugs, after which the joints are thoroughly insulated, the casings replaced and flushed to remove any trapped air and finally sealed.

The arrangement shown in Fig. 3 has the advantage over the one described above in that it is only necessary to evacuate and fill one section, i. e., the new one. In this case the suction side of the vacuum pump is applied to the opening 31.

I am aware of the application for Letters Patent of Vincent A. Sheals, Serial No. 332,905, filed January 16, 1929, and make no claim to the subject matter thereof.

What I claim as new and desire to secure by Letters Patent of the United States, is:

1. The method of replacing an injured section in a cable system having a plurality of connected sections, each of which has a fluid-filled hollow core, which comprises cutting the injured section at points near the adjacent connectors, inserting plugs in the ends of the cores of the sections after the cuts are made to stop the flow of fluid, temporarily capping the ends of the sections, opening the joints and inserting shut-off means in the connectors, removing the caps and end portions of the injured sections from the connectors, connecting the new section at its ends to the connectors, admitting fluid to the new section, opening the shut-off devices, insulating the connectors, and enclosing the connectors in fluid-tight casings.

2. The method of replacing an injured section in a cable system having a plurality of connected sections, each of which has a fluid-filled hollow core, which comprises cutting the injured section at points near the adjacent connectors, inserting plugs in the ends of the cores of the sections where the cuts are made to stop the flow of fluid from the uninjured sections, temporarily capping the ends of the sections, opening the joints and inserting shut-off means in the connectors, removing the caps and portions of the injured sections from the connectors, connecting the new section at its ends to the connectors, evacuating the new section and the adjacent ends of the old sections, admitting fluid to the new section, opening the shut-off means to afford a through passage for the fluid into and through the new section, insulating the connectors, and enclosing the connectors and their insulation in fluid-tight casings.

3. The method of replacing an injured section of a hollow, fluid-filled cable system, which comprises cutting the injured section near the connectors which unite it with the uninjured sections, stopping the flow of fluid from the uninjured sections by inserting plugs in the ends of the short lengths of the injured section which remain attached to the uninjured sections, capping the ends of said short lengths, evacuating the cap to remove air therefrom and also from the exposed cable end exposing the connectors and closing the passages therethrough, removing said short lengths, connecting the ends of the new sections to the connectors, opening the passages in the connectors to permit the flow of fluid between sections, insulating the connectors, and enclosing the connectors and their insulations in fluid-tight casings.

4. The method of replacing an injured section of a hollow core fluid filled cable system which comprises cutting the injured section at the ends thereof adjacent the connectors, temporarily plugging the ends of the cores of the stub ends of the injured cables remaining in the connectors, removing insulation to expose the connectors, shutting off the supply of fluid from the good cable sections to said stub ends, removing the stub ends from the connectors, connecting the ends of the new section to the adjacent ends of the good sections through the connectors, evacuating the new section through one of the connectors, filling the new section with fluid through one of the connectors, establishing a through passage for the fluid between the old and new sections, reinsulating the connectors, and enclosing the insulated connectors in casing sealed to the cable sections.

5. A cable comprising sections each of which has an insulated hollow conductor that is filled with fluid insulation, a hollow connector electrically uniting the conductors of the sections and forming a free passage way for fluid, said connector having screw threaded radial openings extending from the outside to the interior thereof, a screw threaded plug for one of the openings which when seated extends across the base of the connector and shuts off the flow of fluid from one section to the other, and a screw plug for the other of said openings which when removed with the first mentioned plug seated permits one of the sections to be evacuated and filled with fluid independently of the other section.

6. The method of replacing in a cable system an injured section of hollow core fluid filled cable which comprises cutting the injured section at the ends thereof adjacent the connectors, inserting plugs in the stub ends of the injured cable remaining in the connectors to stop the flow of fluid therefrom, removing insulation to expose the connectors, shutting off the supply of fluid from the good cable sections to said stub ends, removing the stub ends from the connectors, connecting the ends of the new section to the good sections through the connectors, establishing a through passage for the fluid between the old and new sections, reinsulating the connectors and adjacent ends of the new and old sections, and enclosing the insulated connectors and adjacent ends of the cable in casings sealed to the cable sections.

7. The method of replacing in a cable system an injured section of hollow core cable that is supplied with fluid by reservoir means, which comprises temporarily shutting off the supply of fluid to the cable from the reservoir means, cutting the injured section at the ends thereof, bending the ends of the good cable sections upwardly to form traps to prevent admission of air, inserting plugs in the exposed stub ends of the cores of the injured cable remaining in the connectors to stop the flow of fluid therefrom and the entrance of air, shutting off the supply of fluid from the good cable sections into said stub ends while permitting seepage of fluid from the insulation to take place, removing the said stub ends from the connectors by the application of heat, connecting the ends of the new section to the adjacent ends of the good sections through the connectors, establishing a through passage for the fluid between the old and new sections, reinsulating the connectors and adjacent ends of the new and old sections, and enclosing the insulated connectors and adjacent ends of the cable in casings sealed to the cable sections.

FRANCIS V. CALVERT.